Sept. 11, 1962 — O. KOHLER — 3,053,952
SWITCHING DEVICE
Filed Oct. 28, 1960

INVENTOR
Otto Kohler
BY George B. Spencer
ATTORNEY

United States Patent Office 3,053,952
Patented Sept. 11, 1962

3,053,952
SWITCHING DEVICE
Otto Kohler, Backnang, Wurttemberg, Germany, assignor to Telefunken G.m.b.H., Berlin-Charlottenburg, Germany
Filed Oct. 28, 1960, Ser. No. 65,755
Claims priority, application Germany Nov. 7, 1959
11 Claims. (Cl. 200—102)

The present invention relates to a switching device.

More particularly, the present invention relates to a relay-type switch having a plurality of magnetic control circuits, which switch is usable particularly in the field of telephony.

In the telephone and communication arts, it is generally sought to provide a connecting-through relay having as many control circuits as possible. In known arrangements, the combination of a larger number of relays produces connecting-through fields which can be used as selector dials. The magnetic systems of such fields should have a high switching speed and should require little control power; also the arrangement should be such that, in order to retain the device in the connecting-through position, no holding current will be required. Furthermore, the entire arrangement should be as compact as possible.

It is, therefore, an object of the present invention to provide a relay which meets the above requirements and, with this object in view, the present invention resides mainly in a relay in which the armatures of the individual control circuits are held in rest position by a permanent magnet, and in which a short counter-energization of a particular control circuit releases the corresponding armature from the action of the permanent magnet and allows it to be moved into an operative position by spring action. Furthermore, an electromagnetic resetting mechanism is provided which is common to the armatures of all of the control circuits, and which resets any armatures that have been actuated.

By virtue of the above arrangement, it is possible to provide an inexpensive relay capable of fulfilling the abovementioned requirements, namely, compactness, low power consumption for operation, and the absence of any holding current. A relay of this type is especially well suited for use in electronic selector systems.

Additional objects and advantages of the present invention will become apparent upon consideration of the following description when taken in conjunction with the accompanying drawings, in which.

Figure 1:
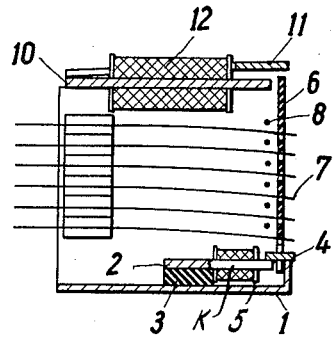
FIGURE 1 is a sectional elevational view of a relay according to the present invention.
Figure 2:
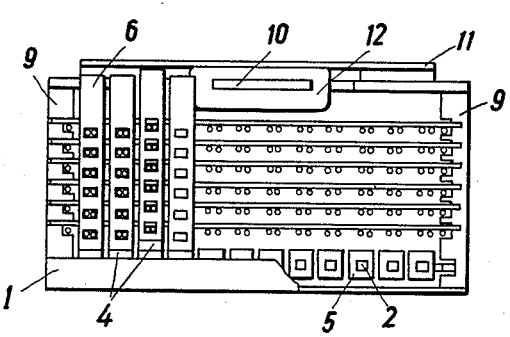
FIGURE 2 is a front view of the relay shown in FIGURE 1.
Figure 3:
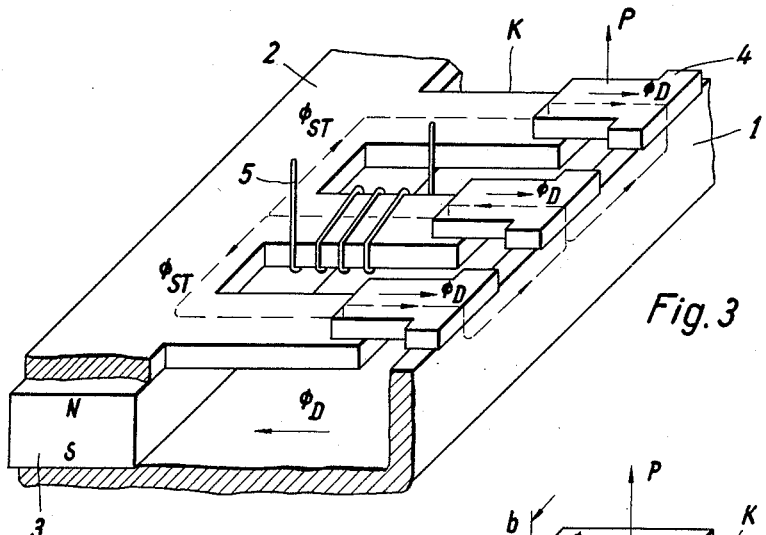
FIGURE 3 is a fragmentary perspective view, on an enlarged scale, of a detail of a relay according to the invention.

Referring now to the drawings and to FIGURES 1 to 3 thereof in particular, there is shown a relay according to the present invention which incorporates a yoke plate 1 and a core plate 2, each of which plates is common to all of the magnetic systems to be described. Both plates are made of magnetically soft iron. The yoke plate 1 is constituted by a metal strip having an angle-shaped cross section and the core plate 2 is pectinate and has a plurality of teeth K constituting, respectively, the cores for the individual magnetic systems.

A permanent magnet 3 is interposed between the yoke plate 1 and the core plate 2, and an electromagnetic coil 5 is wound about each tooth K. The relay further comprises a plurality of armatures 4 which cooperate with the teeth K, respectively, each armature 4 being connected to a switch actuating card or plate 6 which is formed with perforations arranged in a grid-like pattern, through which perforations pass the free ends of wire contact springs 7 of the various movable contacts. Each plate 6 engages all of the contact springs 7 of the same vertical row.

Each horizontal line of movable contacts 7 cooperates with a common stationary contact 8 which may, for example, be in the form of a wire connected to and stretched between the side walls 9 of the relay. In the inoperative position of the relay, all of the armatures 4 are in engagement with the yoke plate 1 and the core plate 2, and are held in this position, against the action of the contact springs 7, by the magnetic holding flux produced by the permanent magnet 3. In this position, the contact springs 7 will be held out of engagement with their respective contacts 8 through the action of the plates 6.

If the holding flux for any particular armature 4 is counter-acted by counter-excitation produced by the corresponding coil 5, the spring force of the contacts 7 will cause such armature to be lifted from the yoke plate 1 and core plate 2, so that the contacts 7 associated with this particular armature will engage their respective contacts 8. The arrangement of the parts is such that, after the armature 4 has been moved, the air gaps formed between armature 4 and the plates 1 and 2 will be so great that the holding flux generated by the permanent magnet 3 will have virtually no effect on the armature, i.e., the holding flux will be insufficient to draw the armature 4 back into engagement with the plates 1 and 2. Thus, the contacts 7 associated with the particular armature 4 will be held in their closed or connecting-through positions without it being necessary to provide any holding current.

It should be noted that if the several magnetic switching systems were completely independent of each other, the counter flux produced by each coil 5 would have to flow by way of the permanent magnet through the yoke, the armature, and thence back to the core. This would necessitate a substantial amount of power inasmuch as permanent magnets, which are made of magnetically hard material, have notoriously poor magnetic conductive properties.

FIGURE 3 shows a portion of a relay according to the present invention which incorporates common yoke and core plates for all of the magnetic systems. In FIGURE 3, the coil 5 about the middle tooth K is shown schematically by several windings, whereas the coils about the adjacent teeth are not shown.

The direction of the holding flux produced by the permanent magnet is shown by the arrows $\phi_D$, while the counter flux produced by the coil 5 is shown in dotted line and labelled $\phi_{ST}$. The magnetic control flux produced by the coil 5 flows through the virtually closed magnetic path afforded by the core plate 2, the adjacent teeth K, the adjacent armatures 4, as well as the yoke plate 1. In so doing, the flux $\phi_{ST}$ will decrease the total flux which holds the armature associated with the middle tooth K while increasing the holding flux acting on the adjacent armatures. As a result, very little power is required for releasing any particular armature which will then move in the direction of the arrow P.

A common magnetic resetting system is provided for breaking a connection, i.e., for resetting the relay. This system comprises an E-shaped core 10, an armature 11, and a resetting coil 12. As soon as the latter is energized, the armature 11 is attracted and presses downwardly any previously actuated plate 6 against the action of the corresponding springs 7. The armature of such plate 6 is then once again brought under the influence of the holding flux produced by the permanent magnet 3, so that after the resetting coil is deenergized, the armature will be held in its inoperative or rest position without any current being required.

Figure 4:
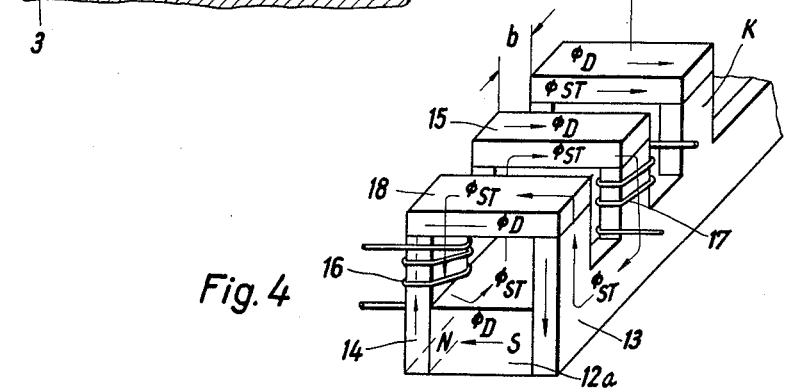
FIGURE 4 is a fragmentary perspective view showing a modification of a relay according to the present invention.

FIGURE 4 shows a further embodiment of a magnetic relay system according to the present invention which operates on the same principle as the previously described embodiment. A permanent magnet 12a is arranged between two pectinate magnetic core plates 13 and 14 which are magnetically connected to each other by flat elements 15 serving as armatures, so that the flux $\phi_D$ produced by the permanent magnet flows from the north pole, in the direction shown by the arrows, through one tooth of the plate 14 the particular armature 18 associated with such tooth, the opposite tooth of the other plate 13, and back to the south pole of the permanent magnet.

The exciter windings 16 and 17 are wound about the teeth of the plates 13 and 14, respectively, as shown in FIGURE 4, so that the armature 18 will be released upon energization of the coil 16. The control flux $\phi_{ST}$ will then flow from the tooth of the plate 14 about which the coil 16 is wound, through the adjacent tooth, the adjacent armature 15, the tooth about which the coil 17 is wound, the armature 18, and back to the tooth about which the coil 16 is wound. The flow of flux through the permanent magnet 12a will be very small because this magnet has a high reluctance. Thus, the control flux $\phi_{ST}$ and the permanent magnet flux $\phi_D$ will be superposed upon each other, and since they act in opposite directions, the total flux through the armature 18 will be reduced, thus allowing the armature to move upwardly in the direction of the arrow P. The total flux through the adjacent armature 15 will, of course, not be reduced; on the contrary, it will be increased. All in all, the reluctance of the path through which the flux $\phi_{ST}$ flows is very low because the flux paths afforded by all of the teeth and armatures are in parallel with each other.

The coils 16 and 17 of adjacent magnetic systems are, as is shown in FIGURE 3, arranged on opposite sides. It is, therefore, possible to fill the entire space b between two adjacent core teeth with the windings of a coil for each particular armature, thereby making it possible to obtain a high magnetomotive force with relatively little power.

The relay, particularly as shown in FIGURE 2, can be used in various types of switching circuits. The six contacts 8 arranged one above the other can represent a six-wire line to which the twelve columns of vertical contacts can be connected, as desired. It is also possible to use the relay as a three-pole switch having twenty terminals by using two of the twelve systems for selecting the upper three wires 8 or the lower three wires 8 at the same time as the remaining ten systems are used. If three systems are used for selecting the wires 8, then a two-pole switch having 3×9=27 terminals is obtained. Finally, if six systems are used for selecting the wires 8, a single pole switch having 6×6=36 terminals is obtained. In all of these cases, two contact systems must always be used, one for effecting the connecting-through and one for selecting the particular wires 8.

It will be understood that the above description of the present invention is susceptible to various modifications, changes and adaptations, and the same are intended to be comprehended within the meaning and range of equivalents of the appended claims.

I claim:
1. In a multiple magnetic relay, the combination which comprises: a plurality of switching means spring-biased into operative position; a plurality of armatures coacting with said switching means, respectively; permanent magnet means for holding said armatures in a rest position against the action of said spring-biased switching means; a plurality of electromagnet means coacting with said armatures, respectively, for counter-acting the holding force of said permanent magnet means and thereby releasing any selected armature to allow the switching means with which the selected armature coacts to be moved into its operative position; and a single electromagnetic resetting member common to and coacting with all of said armatures for returning the same to their respective rest positions, whereby the power required for releasing any one armature is small as compared to that required for energizing said resetting member.

2. In a multiple magnetic relay, the combination which comprises: a plurality of switching means spring-biased into operative position; magnetic circuit means including permanent magnet means and forming a plurality of magnetic circuits all of which are magnetically connected to each other, each of said circuits including an armature coacting with a respective switching means, through which armature, when in its rest position, flows a holding flux produced by said permanent magnet means, and counter-excitation means for counter-acting said holding flux and thereby releasing any selected armature to allow the switching means with which the selected armature coacts to be moved into its operative position; and a single electromagnetic resetting member common to and coacting with all of said armatures for returning the same to their respective rest positions, whereby the power required for releasing any one armature is small as compared to that required for energizing said resetting member.

3. The combination defined in claim 2 wherein said magnetic circuit means form low reluctance flux paths for the counter-excitation flux produced by any one counter-excitation means.

4. The combination defined in claim 3 wherein said low reluctance flux paths include armatures other than the one in which said holding flux is being counter-acted, whereby the holding force acting on such other armatures is increased.

5. The combination defined in claim 2 wherein said magnetic circuit means include a core plate and a yoke plate, both coacting with said armatures, said permanent magnet means being arranged between said plates so that said holding flux flows through said plates and each of said armatures when the latter are in rest position.

6. The combination defined in claim 2 wherein said magnetic circuit means include two parallel spaced core plates having opposite teeth coacting with said armatures, said permanent magnet means being arranged between said plates so that said holding flux flows through said plates and each of said armatures when the latter are in rest position.

7. The combination defined in claim 2 wherein said magnetic circuit means includes two plates coacting with said armatures, at least one of said plates having teeth engaged by said armatures, respectively, said permanent magnet means being arranged between said plates so that said holding flux flows through said plates, including said teeth of said one plate, when said armatures are in rest position.

8. The combination defined in claim 7 wherein said counter-excitation means of each magnetic circuit includes a coil wound about a tooth of said one plate.

9. The combination defined in claim 2 wherein each armature is a flat element which, when in rest position, engages the remainder of said magnetic circuit means and, when said switching means are in operative position, forms an air gap between itself and said remainder of said magnetic circuit means.

10. The combination defined in claim 2 wherein each armature is connected to its switching means by a switch actuator which is in the form of a perforated card.

11. The combination defined in claim 10 wherein said switching means include spring elements projecting through perforations of said card.

References Cited in the file of this patent

UNITED STATES PATENTS

| | | |
|---|---|---|
| 2,558,524 | McBerty et al. | June 26, 1951 |
| 2,741,728 | Distin | Apr. 10, 1956 |
| 2,863,020 | Braumann | Dec. 2, 1958 |
| 2,889,425 | Yule et al. | June 2, 1959 |

FOREIGN PATENTS

| | | |
|---|---|---|
| 251,317 | Great Britain | Apr. 22, 1926 |